Sept. 6, 1938.    H. D. GEYER    2,129,124

TRANSMISSION MOUNT

Filed Sept. 14, 1933

INVENTOR
Harvey D. Geyer
BY
Spencer Hardman & Fehr
HIS ATTORNEYS

Patented Sept. 6, 1938

2,129,124

UNITED STATES PATENT OFFICE 2,129,124

TRANSMISSION MOUNT

Harvey D. Geyer, Dayton, Ohio, assignor, by mesne assignments, to General Motors Corporation, Detroit, Mich., a corporation of Delaware Application September 14, 1933, Serial No. 689,358

4 Claims. (Cl. 248—9)

This invention relates to the resilient support of an automobile power plant unit upon the chassis frame.

An object of the invention is to provide a double mount support wherein one mount thereof will resiliently support the vertical loads between one end of the power plant unit and the chassis frame and the other mount located adjacent thereto will take a large percentage of or substantially all the end thrust loads between the power plant unit and the chassis frame.

A more specific object is to provide such a double mount for supporting a transmission housing which is rigidly fixed to the rear end of the power plant unit.

A further object is to provide such a double mount having both of its mounts centered substantially on the central vertical longitudinal plane of the power plant unit, whereby harmful vibration effects of the power plant unit upon the chassis frame are lessened.

Further objects and advantages of the present invention will be apparent from the following description, reference being had to the accompanying drawing, wherein a preferred embodiment of one form of the present invention is clearly shown.

In the drawing.

Similar reference characters refer to similar parts throughout the several views.

Figures 1, 2:
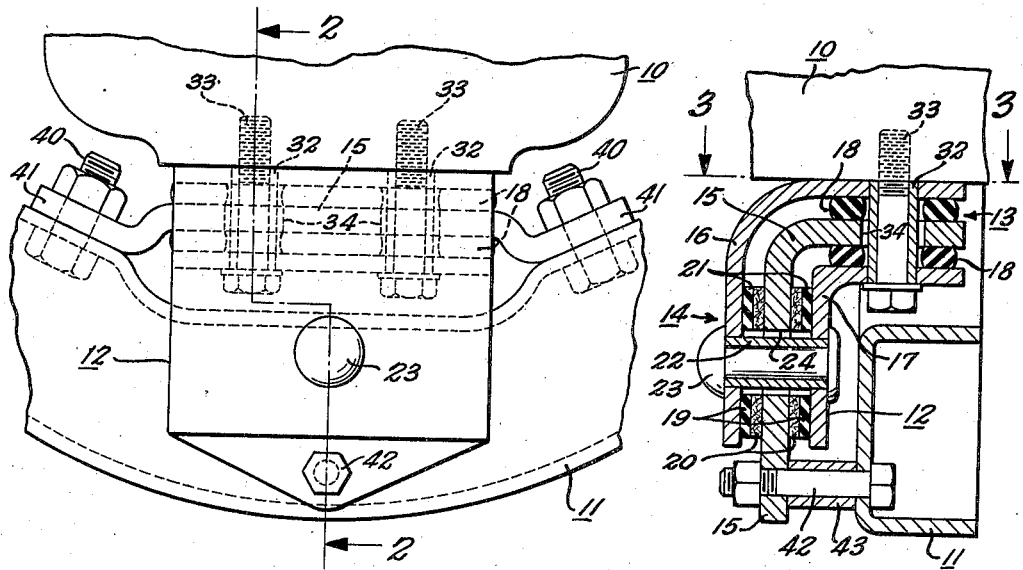
Fig. 1 is a rear end view showing the rear end of an automobile transmission housing mounted upon the cross member of the chassis frame by a double mount according to this invention.
Fig. 2 is a vertical section on line 2—2 of Fig. 1.
Figures 3, 4:
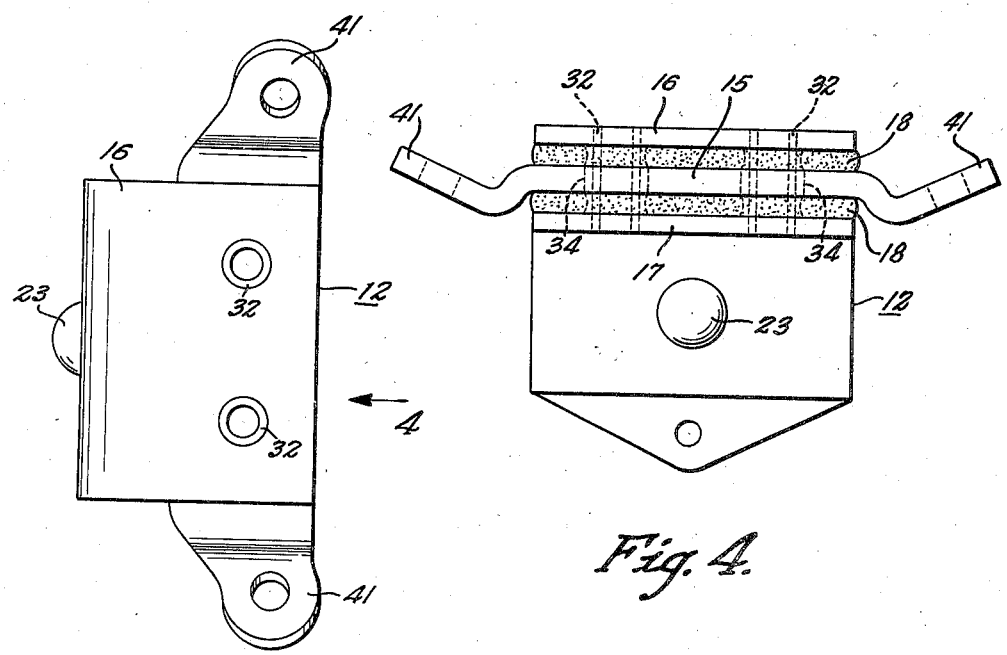
Fig. 3 is a plan view of the detached unitary double mount shown in Figs. 1 and 2.
Fig. 4 is a front elevation of the detached unitary double mount looking in the direction of arrow 4 of Fig. 3, but shows the rubber elements bulged out at the unconfined edges thereof as it does when supporting the engine weight.

Numeral 10 designates the rigid stationary transmission housing which is rigidly fixed to the rear end of and in effect forms an integral part of the automobile power plant unit (not shown), as is customary in present day automobiles. 11 is a heavy cross frame member of the chassis frame and curves down below and adjacent to the transmission housing 10 to serve as a suitable support therefor. A unitary double mount 12 connects the under side of the transmission housing 10 to the cross member 11. This double mount 12 comprises a substantially horizontally disposed resilient mount 13 for taking vertical loads and a substantially vertically disposed end thrust mount 14 for transmitting longitudinal end thrust loads between the chassis frame and the power plant unit, both mounts 13 and 14 being preferably centered on the central vertical longitudinal plane of the power plant unit as indicated in Fig. 1.

This double mount 12 comprises an inner angular metallic plate 15, formed as illustrated, and two outer angular metallic plates 16 and 17 on opposite sides thereof and held spaced therefrom by the two resilient rubber blocks 18 on the horizontal legs thereof, with the two friction blocks 19 interposed between the vertical legs thereof. The two resilient rubber blocks 18 are preferably vulcanized in situ upon the plate 15 prior to assembling the other metal part thereto. The two friction blocks 19 each comprise a non-metallic composition friction lining 20 (which may be automobile brake lining or similar material), each friction lining 20 being preferably backed by a resilient rubber cushion 21 (see Fig. 2). These two friction blocks 19 are held suitably compressed between the central plate 15 and the two outer plates 16 and 17 by the length of the spacer tube 22 and the rivet 23 inserted through a central hole provided in all the necessary parts as clearly shown in Fig. 2. The hole 24 provided in the central plate 15 is sufficiently large to permit said plate 15 to clear the spacer tube 22 sufficiently to permit considerable relative vertical or lateral movement between the central plate 15 and the two outer plates 16 and 17, which relative movement is resisted by the friction of the friction blocks 19 rubbing over the vertically disposed surface of plate 15.

Two laterally spaced spacer tubes 32 are provided through suitable holes in the horizontal legs of plates 16 and 17 for receiving the two bolts 33 which clamp the unitary double mount 12 to the bottom of the transmission housing 10. Bolts 33 are drawn home against the ends of tubes 32, which tubes 32 are of such length as to permit the two resilient rubber blocks 18 to be initially compressed the desired amount when the two bolts 33 are drawn up tight. The two holes 34 in the central plate 15 give the desired suitable clearance between plate 15 and tube 32 and so prevent metallic contact between any metal parts attached to the housing 10 and any metal parts attached to the cross member 11. The central plate 15 is rigidly fixed to the cross member 11 by the two bolts 40 extending through the projecting ears 41 on plate 15, and also preferably by the lower central bolt 42 and spacer tube 43 in an obvious manner. It is thus seen that the central plate 15 is very rigidly fixed to the cross member 11 while the two outer plates 16 and 17 are fixed to the transmission housing 10 and that there is only a yielding non-metallic connection between the two.

In operation, the horizontally disposed mount 13 (comprising the two resilient rubber blocks 18 and associated metal parts) will obviously take substantially all the vertical loads, either up or down, at the rear end of the power plant unit of which housing 10 is in effect an integral part. Also the vertically disposed mount 14 (comprising the two friction blocks 19 and associated metal parts) will obviously take substantially all longitudinal end thrust between the power plant unit and the chassis frame since the mount 13 will yield quite easily a limited amount in such endwise direction. When any vertical loads cause a vertical yielding of mount 13 such vertical movement is frictionally resisted and hence damped by the mount 14, caused by the friction blocks 19 sliding upon the surfaces of plate 15. Also any relative pivoting movement or vibration of the power plant unit as a whole about any longitudinal axis thereof is likewise frictionally resisted and hence damped by the friction blocks 19 sliding upon the surfaces of the relatively stationary plate 15.

While the form of embodiment of the present invention as herein disclosed, constitutes a preferred form, it is to be understood that other forms might be adopted, all coming within the scope of the claims which follow.

What is claimed is as follows:

1. In an automobile, in combination, a power plant unit, a chassis frame having a cross frame member, a resilient support supporting the weight of one longitudinal end of said power plant unit upon said cross member, said support comprising: a mount resiliently supporting the vertical load of the power plant upon said cross member and being relatively more yieldable in a horizontal than vertical direction, and a second adjacent mount independently transmitting longitudinal thrust loads between said cross member and said power plant, said second mount being relatively more yieldable in a vertical than longitudinal direction and having relatively slidable friction means which damps the vertical movement between said power plant and cross member by sliding friction.

2. In an automobile, in combination, a power plant unit, a chassis frame having a cross frame member, a resilient support for one end of said power plant unit upon said cross member, said support comprising: a resilient mount permitting a relatively greater horizontal than vertical movement and so arranged as to take substantially all the vertical loads between one end of said power plant and cross member, and a second mount adjacent thereto and so arranged as to transmit substantially all the longitudinal thrust loads between said power plant and cross member, said second mount having relatively slidable friction means for resisting by sliding friction the vertical movement permitted by said first mount.

3. In an automobile, in combination, a power plant unit having a transmission housing rigidly fixed thereto at its rear end, a chassis frame having a cross frame member located adjacent said transmission housing, a resilient support connecting said transmission housing to said cross member, said support comprising: a mount resiliently supporting the major vertical loads between said housing and cross member, and a second adjacent mount independently transmitting the major longitudinal thrust loads between said housing and cross member and permitting relatively easy movement in a transverse plane, said second mount having relatively slidable friction means for frictionally resisting vertical movement permitted by said first mount.

4. In an automobile, in combination, a power plant unit, a chassis frame for supporting said power plant unit and having a cross frame member, a resilient support located substantially in an axial vertical plane at one longitudinal end of said power unit and fixed to said cross frame member, said resilient support comprising two elements the first of which independently carries substantially all the vertical loads at that end of said power unit, and the second of which independently carries substantially all the axial thrust loads between said power unit and chassis frame, said second element having vertically sliding friction means which damps any vertical movement permitted by said first element.

HARVEY D. GEYER.